No. 860,858. PATENTED JULY 23, 1907.
R. M. DIXON.
STEAM TRAP.
APPLICATION FILED MAR. 24, 1904.
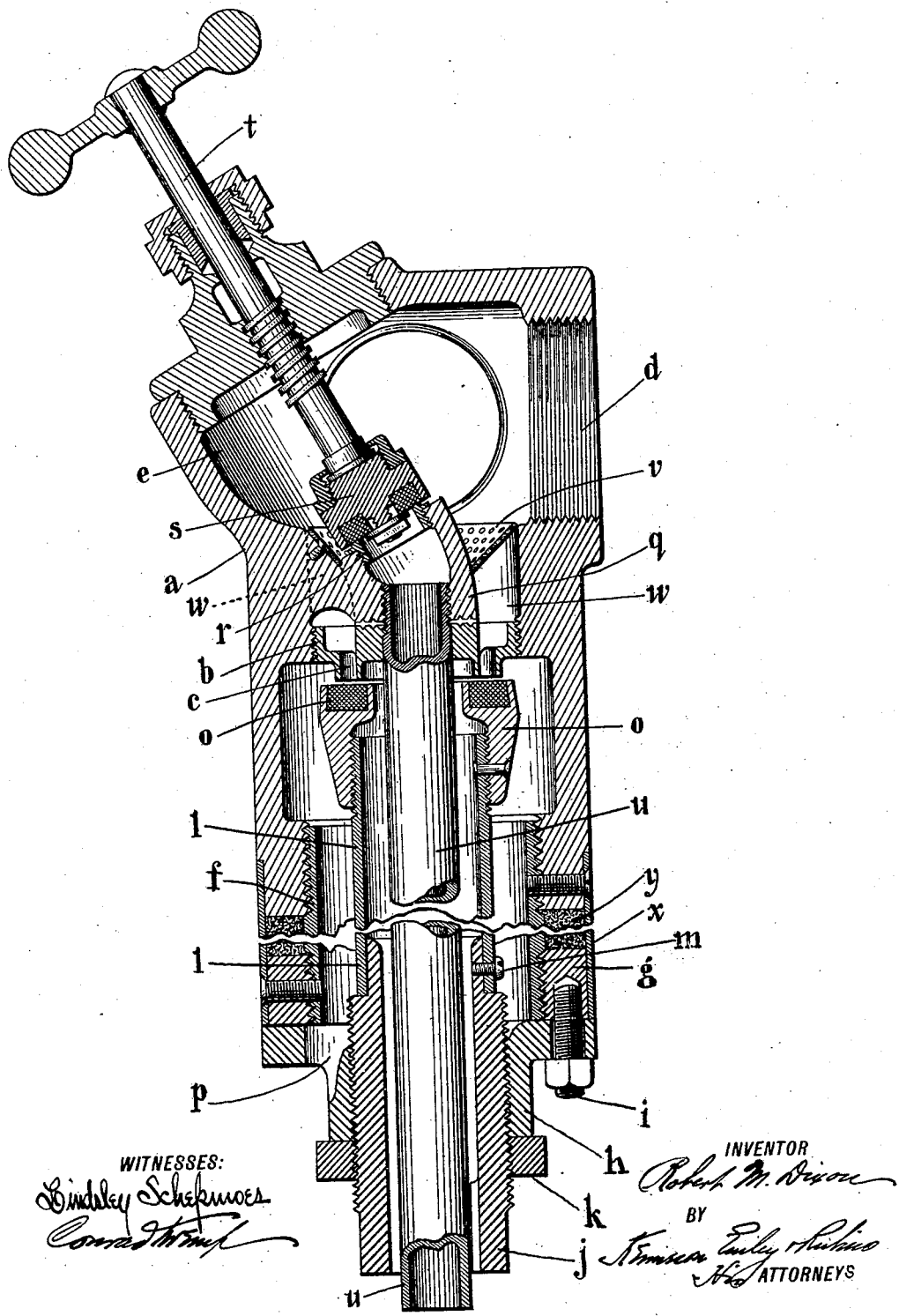

UNITED STATES PATENT OFFICE.

ROBERT M. DIXON, OF EAST ORANGE, NEW JERSEY, ASSIGNOR TO THE SAFETY CAR HEATING & LIGHTING COMPANY, A CORPORATION OF NEW JERSEY.

STEAM-TRAP.

No. 860,858.        Specification of Letters Patent.        Patented July 23, 1907.

Application filed March 24, 1904. Serial No. 199,677.

*To all whom it may concern:*

Be it known that I, ROBERT M. DIXON, a citizen of the United States, residing in East Orange, in the county of Essex and State of New Jersey, have invented certain new and useful Improvements in Steam-Traps, of which the following is a specification.

My invention relates to steam traps.

In the accompanying drawing, I have shown in a transverse longitudinal section a steam trap in which one form of my invention is embodied.

Among the objects of my invention, considered separately and apart from each other, are first, to produce a steam trap in which the thawing, when such becomes necessary, is effected by heat radiation instead of by direct contact of live steam as heretofore practiced; second, to provide separate discharge outlets from the automatic valve and the hand operated valve whereby in case of leakage of either valve that fact may be readily determined; and third, to improve the details of construction so as to produce a highly efficient trap.

The trap is shown in the form of a vertical trap as my invention, so far as I have at present contemplated it, finds its readiest adaptation in vertical traps.

In the accompanying drawing, $a$ indicates a suitable head within which is located a valve seat $b$ herein shown as screw-threaded in the head largely for the purpose of ready adjustment. This valve seat $b$ is annular and is provided at intervals with discharge orifices $c$. The valve seat $b$ coöperates with the automatic valve as will be hereinafter described. The steam inlet $d$ communicates with a chamber $e$ in the head.

Supported by the head $a$ preferably by being screw-threaded therein is a pipe $f$ preferably made of wrought iron. At the end of this pipe opposite to the head $a$ is a ring $g$ shown as screw-threaded thereon and adapted to support a sleeve $h$ shown as secured thereto by stud-bolts $i$. The sleeve $h$ is internally screw-threaded for the reception of an externally screw-threaded bushing $j$ which externally screw-threaded bushing $j$ is adjustable for the purpose of adjusting the inter-relations of the expansible elements of the expansion devices of the trap and is shown as provided with a lock-nut $k$. The bushing $j$ carries a pipe $l$ preferably brazed thereon and secured by one or more screws $m$. The pipe $l$ is preferably of brass.

It will be understood that the pipes $f$ and $l$ are of different metals in order to constitute a thermostatic couple and that any metals found desirable for this purpose may be employed.

Screwed or otherwise secured upon the end of the pipe $l$ is a valve $o$ herein called the automatic valve for the reason that the thermostatic action automatically operates the said valve. This valve coöperates with the valve seat $b$ and is operated or moved by the thermostatic action of the trap so as to automatically discharge the water of condensation as will be readily understood. This water of condensation is discharged partly through apertures $p$ and partly through a portion of the space within the brass tube $l$.

Seated upon the valve seat or otherwise suitably secured in the head is an elbow sleeve $q$ herein shown as provided with an adjustable valve seat $r$ to which a hand operated valve $s$ is adapted, said hand operated valve being provided with any usual or preferred operating means, for instance, a valve-spindle $t$.

Supported from the elbow sleeve $q$ or otherwise suitably supported in the device is an inner steam discharge tube $u$. It will be obvious that by operating the hand operated valve $s$ steam will be discharged from the trap through the inner tube $u$, which in the present instance is shown as extending entirely through the trap through a portion of the space within the brass tube $l$.

I have found it desirable to employ a screen or strainer $v$ in the head, which screen or strainer is herein shown as frusto-conical and supported upon lugs $w$. This strainer surrounds the elbow sleeve $q$ and is adapted to deliver its contents into the said elbow sleeve when the hand operated valve goes into action.

The head $a$ and ring $g$ serve to support an exterior shell $x$ between which shell and the outer or iron pipe is a filling of hair-felt $y$. The object of employing this non-conducting jacket is to maintain the trap as nearly as possible at a given temperature.

It will be understood that it is desirable that after the parts of the thermostatic device have been adjusted that it should be unnecessary to reset or adjust the same within fairly normal ranges of temperature and by providing the heat insulating jacket the trap is kept at a fairly uniform temperature even during normal and abnormal variations of temperature, such, for instance, as would be experienced by a railroad train running from the sea level through a mountainous country.

It is obvious that the details of construction described herein can be modified without departing from the spirit of the invention.

The trap operates in a well understood manner. As soon as a sufficient quantity of water of condensation has collected to cause the expansion devices constituted by thermostatic couple to move the automatic valve $o$ away from its seat the water of condensation will be discharged; as before stated, partly through the space between the brass and iron tubes and the apertures $p$ in the sleeve $h$ and partly through the space between the brass tube and the inner tube $u$. If for any cause, such as freezing of the trap, it is found desirable to blow out the trap or to thaw the same out the hand operated valve may be manipulated so that steam will be blown through the inner pipe $u$. In the construction shown the inner pipe $u$ extends entirely through the trap and the trap is heated by radiation from the said pipe instead of by the direct contact of steam with an element of the expansion device.

It will further be noted that I provide separate orifices for delivery from the hand operated valve and from the automatically operated valve so that in case either valve leaks such leakage can be detected and the leaky valve identified.

Having described my invention, what I claim and desire to secure by Letters Patent is:—

1. In an expansion trap, the combination of an expansion member, an automatic valve operated thereby, a hand-controlled valve, and a heat-radiating device free from said expansion member and in fluid-conducting connection with said hand valve adapted for conveying fluid from the trap out of contact with the expansion member.

2. In an expansion trap, the combination of an expansion member, an automatic valve operated thereby, a hand valve, and a steam-conducting device in open connection with said hand valve and free from said expansion member, but in heat-radiating proximity to the same, adapted for conducting a fluid from the trap.

3. In an expansion trap, the combination of a hand valve, an automatic valve, an expansion member for operating the automatic valve, and a steam-conducting device free from said expansion member for receiving steam from the hand-operated valve adapted for conducting fluid from the trap out of contact with said expansion member but in heat-radiating proximity thereto.

4. In an expansion trap, the combination of an expansion member constituted by a plurality of tubes of different metals, one located within the other, an automatic valve operated thereby, a hand-operated valve, and a separate tube in heat-radiating proximity to one tube of the expansion member and so constructed and arranged as to be separated by a space from the expansion member.

5. In an expansion trap, the combination of an expansion member comprising a plurality of connected tubes, one within the other, an automatic valve operated by said expansion member, a hand-operated valve, and a pipe within the inner tube out of contact therewith but in fluid conducting connection with the hand-operated valve and extending through a portion of the space in the inner tube in heat-radiating proximity thereto.

6. In an expansion trap, the combination of a head having a plurality of valve seats, an automatically-operated valve adapted to one seat and a hand-operated valve adapted to the other of said seats, expansion means for operating the automatically-operated valve, and steam-conducting means in fluid-conducting connection with the hand-valve seat and in heat-radiating proximity only to the operative parts of the trap.

7. In an expansion valve, the combination of an expansion member comprised by an outer tube and an inner tube, the inner tube being supported by the outer tube, a valve carried by the inner tube, and means for discharging steam located within said inner tube out of contact therewith but in heat-radiating proximity thereto.

8. In an expansion trap, the combination of an expansion device, an automatic valve operated thereby, a hand-operated valve, and separate means for discharging from each of said valves through the trap in order to provide independent discharge conduits for each of said valves, one of said discharging means being free from said expansion device but in heat-radiating connection therewith adapted to convey steam from the trap and maintain the same out of contact with said expansion device.

9. In a trap, the combination of an automatically-operated valve, a hand-operated valve, and means for independently discharging from each valve comprising independent conduits, and a shell surrounding the conduits upon which one of said discharge devices is supported.

10. In an expansion trap, the combination of an expansion device carried by the outer tube of a plurality of connected tubes, a jacket of non-conducting material inclosing the outer tube and adapted to protect the same from cold and to retain the heat developed in the trap, and means for adjusting the expansion device to a given normal temperature.

11. In a device of the class described, the combination with a body portion forming a shell, of an expansion member carried by said shell and having a valve adapted to be seated in said body portion, a hand-operated valve, and a discharge conduit extending from said hand-operated valve out of contact with said expansion member, but in heat-radiating connection therewith.

12. In a device of the class described, the combination of an outer shell, an expansion member carried by said outer shell, a valve operated automatically by said expansion member, a hand-operated discharge valve, and a discharge conduit leading from said hand-operated discharge valve free from said expansion member but extending in heat-radiating proximity through the same.

13. In an expansion trap, the combination of a valve seat, an automatic valve, an expansion member actuating said automatic valve, and a fluid discharge device leading from the trap within said expansion member out of contact therewith but in heat-radiating proximity thereto adapted to heat the same by radiation.

ROBERT M. DIXON.

Witnesses:
G. R. JEWETT,
EHNER E. ALLBU.